United States Patent [19]

Arndt

[11] 4,296,847
[45] Oct. 27, 1981

[54] TRANSMISSION SHIFT LEVER BACKDRIVE AND COLUMN LOCKING MECHANISM

[75] Inventor: Frederick P. Arndt, Saginaw, Mich.

[73] Assignee: General Motors Corporation, Detroit, Mich.

[21] Appl. No.: 133,890

[22] Filed: Mar. 25, 1980

[51] Int. Cl.³ ............................................. B60K 41/26
[52] U.S. Cl. .................................... 192/4 A; 70/247; 74/104; 180/287
[58] Field of Search ................. 192/4 A, 4 R; 70/247, 70/245, 252; 180/271, 287; 74/104, 96

[56] References Cited

U.S. PATENT DOCUMENTS 3,001,618  9/1961  McCordic et al. ................. 192/4 A
3,917,021  11/1975  Williams et al. ................... 70/245 X

*Primary Examiner*—George H. Krizmanich
*Attorney, Agent, or Firm*—Donald F. Scherer

[57] ABSTRACT

A console or floor-mounted shift lever is connected through a flexible cable to a coupling mechanism mounted on the steering column. The coupling mechanism has a coupling member which is linearly guided in a support bracket and is selectively connectable with an actuator member pivotally mounted on the support bracket and drivingly connected to a portion of the steering column. The coupling cooperates with the actuator such that the actuator is stationary while the transmission shift lever is moved through the conventional shift pattern from "Low" to "Reverse" and is pivoted when the shift lever is moved from "Reverse" to "Park". The pivoting movement of the actuator results in rotation of a portion of a steering column which then permits a conventional ignition locking mechanism to be moved to the "Lock" position.

2 Claims, 5 Drawing Figures

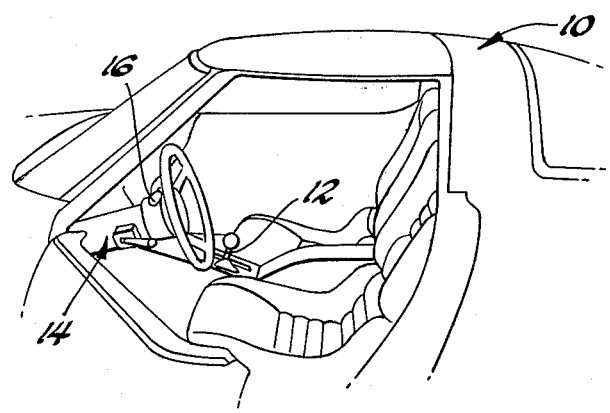
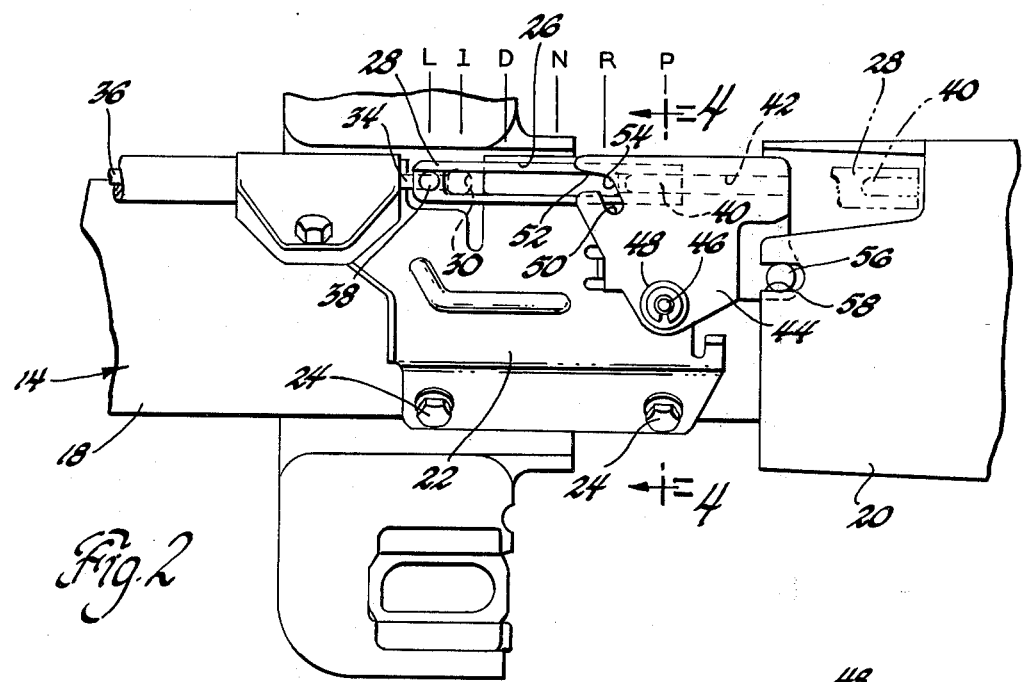
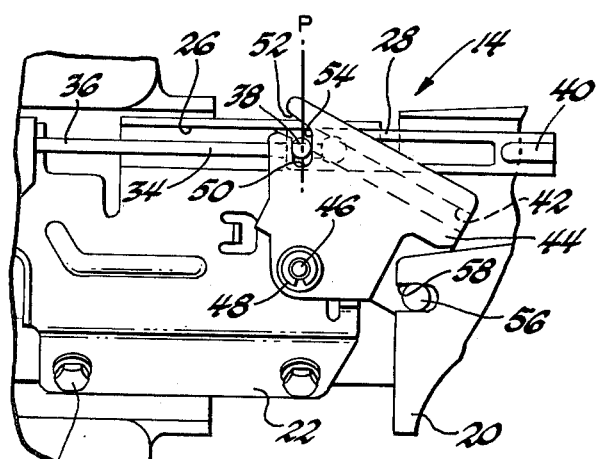
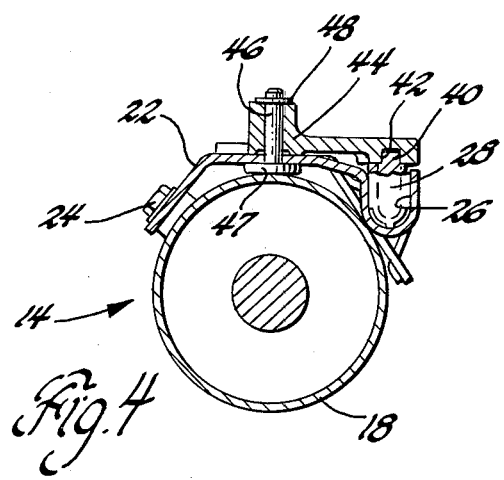
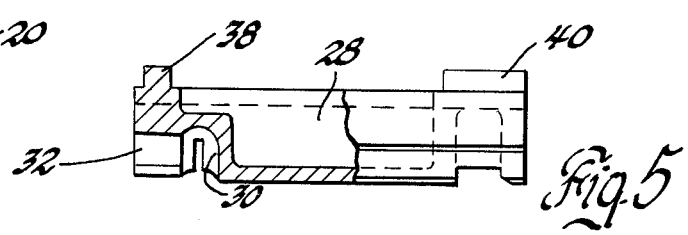

TRANSMISSION SHIFT LEVER BACKDRIVE AND COLUMN LOCKING MECHANISM

This invention relates to backdrive mechanisms between the transmission shift lever and the vehicle steering column, and more particularly to such backdrive mechanisms which require the transmission mechanism to be in the "Park" position prior to locking of the steering column.

It is an object of this invention to provide an improved backdrive connection between a floor-mounted transmission lever and a steering column locking mechanism.

It is another object of this invention to provide an improved backdrive mechanism for use with a floor-mounted transmission shift control wherein the backdrive mechanism enforces pivotal movement of an actuating member when the transmission lever is moved from "Reverse" to "Park" to permit locking of the steering column.

It is a further object of this invention to provide an improved backdrive mechanism wherein a flexible motion transmitting member is connected between a transmission shift lever and a slidable coupling mounted on the steering column, and wherein the slidable coupling is operable to pivot an actuator member which induces movement in a portion of the steering column so that steering column locking can be accomplished.

These and other objects of the present invention will be more apparent from the following description and drawings wherein:

FIG. 1 is a perspective view of a portion of the inside of an automobile;

FIG. 2 is a top view of a portion of a vehicle steering column showing the backdrive mechanism in one operating condition;

FIG. 3 is a view similar to FIG. 2 showing the portion of the steering column with the backdrive mechanism in another operating condition;

FIG. 4 is a sectional view taken along line 4—4 of FIG. 2; and

FIG. 5 is a side elevational view, partly in section of a component of the backdrive mechanism.

Referring to the drawings, wherein like characters represent the same or corresponding parts throughout the several views, there is seen in FIG. 1 a portion of a passenger vehicle, generally designated 10, having a floor-mounted transmission shift lever 12 and a steering column, generally designated 14. The transmission shift lever 12 is preferably constructed in accordance with the floor-mounted shift control mechanism shown in U.S. Pat. application Ser. No. 11,395, filed Feb. 12, 1979, and assigned to the assignee of the present invention.

The steering column 14 includes a locking mechanism 16 which may be constructed in accordance with U.S. Pat. Nos. 3,648,490 issued Mar. 14, 1972 or 3,572,067 issued Mar. 23, 1971, and assigned to the assignee of the present application. These steering column locking mechanisms permit the operator to lock the steering column to prevent unauthorized use and also provide for locking of the column-mounted transmission shift control mechanisms. Most current steering column mechanisms are designed such that the steering column lock cannot be moved to the "Lock" position until the transmission has been placed in the "Park" position. As is well-known in such mechanisms, a portion of the steering column is adapted to rotate with transmission selection to permit the controlled locking of the steering column.

There is seen in FIG. 2, a portion of the steering column 14 including a mast jacket 18 and a shift bowl or rotatable member 20. A support bracket 22 is secured to the mast jacket 18 by a plurality of fasteners, such as 24, shown in FIGS. 2 and 4.

As seen in FIG. 4, the support bracket 22 includes a U-shaped guide slot 26 in which is slidably disposed a coupling member 28. As seen in FIG. 5, the coupling 28 includes a ball socket 30 and has a substantially circular aperture or passage 32 formed in one end thereof and connected with the ball socket 30. The ball socket 30 and aperture 32 are operable to provide a connection with an end 34 of a flexible cable 36. The flexible cable 36 can be constructed in accordance with any of the well-known flexible cable structures. The other end of flexible cable 36, not shown, is connected with the transmission shift lever 12. This connection can be made in accordance with the teaching of the above U.S. Pat. application Ser. No. 11,395.

The coupling 28 has formed integrally therewith a cam pin 38 and a guide member 40. As seen in FIGS. 2 and 4, the guide member 40 is slidably disposed in a slot 42 formed in an actuator 44. The actuator 44 is pivotally mounted on the support bracket 22 by a pin 46. The pin 46 is retained in position by an enlarged head 47 and a C-ring 48.

The actuator 44 also has a cam slot 50 formed therein. The cam slot 50 has an opening 52 which is slightly wider than the cam pin 38 and a groove portion 54 which is essentially the same dimension as the cam pin 38. The actuator 44 also has integral therewith a pin 56 which is disposed in a slot 58 formed in the shift bowl 20.

When the transmission shift lever 12 is in the "Low" (L) position, the cam pin 38 and guide member 40 will be positioned as shown in FIG. 2. That is, the cam member 38 is displaced longitudinally from the opening 52 and the guide 40 is slidably engaged in the slot 42. As the transmission shift lever 12 is moved from the (L) position through the "Intermediate" (I), "Drive" (D) and "Neutral" (N) positions to the "Reverse" (R) position, the cam pin 38 will engage in the cam slot 50 through the opening 52. This engagement occurs when the transmission shift lever is moved from (N) to (R). Also, as seen in phantom line in FIG. 2, the guide 40 is disengaged from the slot 42 as the transmission shift lever is moved from (N) to (R).

When the transmission shift lever 12 is moved from (R) to "Park" (P), the actuator 44 will pivot on pin 46 from the position shown in FIG. 2 to the position shown in FIG. 3. This pivotal movement is enforced by the cam pin 38 operating in the cam slot 50. Pivoting of the actuator 44 causes rotary movement of the shift bowl 20 through the drive connection formed by pin 56 and slot 58. The rotary motion of the shift bowl 20 wil place a column locking mechanism such as that shown in U.S. Pat. No. 3,648,490 in a position to permit locking.

When the steering column 14 has been locked in the position shown in FIG. 3, the flexible cable 36 cooperates with the shift lever 12 to prevent movement of the shift lever 12 from the "Park" (P) position. If the steering column lock mechanism is moved from the "Lock" position to one of the other operating positions, the transmission shift lever 12 can be moved from the "Park" position. Movement of the transmission shift lever 12 from (P) to (R) will result in pivoting of the actuator 44 from the position shown in FIG. 3 to the position shown in FIG. 2. The transmission shift lever 12 may then be moved to any of the other operating positions. Upon movement of the transmission lever 12 from (R) to (N), the cam pin 38 will be disengaged from slot 50 while the guide member 40 will slidably engage in slot 42. The guide member 40 will engage in the guide slot 42 prior to the cam pin 38 disengaging the cam slot 50 such that the pivotal position of the actuator 44 is always under the control of the coupling 28.

It will also be appreciated from the above discussion, that the coupling 28 is continually guided for longitudinal movement in the U-shaped guide slot 26 which will ensure proper alignment between the components of the coupling 28 and the actuator 44.

The embodiments of the invention in which an exclusive property or privilege is claimed are defined as follows:

1. A transmission shift lever backdrive and column locking mechanism for use in a motor vehicle having a floor-mounted transmission shift lever movable in a plurality of operating conditions including "Park" and "Reverse", and a lockable steering column shift bowl operable to be positioned for locking only when the transmission is in the "Park" operating condition, said mechanism comprising; a support bracket mounted on the steering column and having integrally formed guide means; coupling means slidably disposed in said guide means and including cam means and linear guide means; flexible force and motion transmitting means connected between said coupling means and the transmission shift lever for transmitting the selected operative condition from the transmission shift lever to the coupling means; and actuator means pivotally mounted on said steering column and operatively connected with the shift bowl, said actuator means including cam slot means selectively engageable by said cam means for enforcing pivoting of the actuator means when the shift lever is moved from the "Reverse" operating condition to the "Park" operating condition for positioning the shift bowl to permit locking of the steering column, and linear guide slot means for selectively engaging said linear guide means when the transmission shift lever is moved from the "Reverse" operating condition to the other operating conditions for preventing pivoting of the actuator means and thereby preventing positioning of the shift bowl to prevent locking of the steering column.

2. A transmission shift lever backdrive and column locking mechanism for use in a motor vehicle having a floor-mounted transmission shift lever movable in a plurality of operating conditions including "Park" and "Reverse", and a lockable steering column having a portion operable to be moved to a "Lock" position only when the transmission is in the "Park" operating condition, said mechanism comprising; a support bracket mounted on the steering column and having an integrally formed U-shaped guide slot; linearly movable coupling means slidably disposed in said U-shaped guide slot and including a cam pin and a guide member; flexible force and motion transmitting means connected between said linearly movable coupling means and the transmission shift lever for transmitting the selected operative condition from the transmission shift lever to said linearly movable coupling means; and actuator means pivotally mounted on said steering column and operatively connected with the lockable steering column, said actuator means including cam slot means selectively engageable by said cam pin for enforcing pivoting of the actuator means when the shift lever is moved from the "Reverse" operating condition to the "Park" operating condition for positioning the portion of the steering column to permit locking of the steering column, and linear guide slot means for selectively engaging said guide member when the transmission shift lever is moved from the "Reverse" operating condition to the other operating conditions for preventing pivoting of the actuator means and thereby preventing positioning of the portion of the lockable steering column to prevent movement to the "Lock" position.

* * * * *